US011273995B2

(12) United States Patent
Martin et al.

(10) Patent No.: US 11,273,995 B2
(45) Date of Patent: *Mar. 15, 2022

(54) SUCTION GRIPPER DEBRIS FILTER

(71) Applicant: AMP Robotics Corporation, Louisville, CO (US)

(72) Inventors: Travis W. Martin, Lakewood, CO (US); Scott E. Krueger, Longmont, CO (US); John C. McCoy, Jr., Thornton, CO (US); Matanya B. Horowitz, Golden, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,392

(22) Filed: Oct. 2, 2020

(65) Prior Publication Data

US 2021/0086999 A1 Mar. 25, 2021

Related U.S. Application Data

(63) Continuation of application No. 16/536,736, filed on Aug. 9, 2019, now Pat. No. 10,793,377.

(60) Provisional application No. 62/718,150, filed on Aug. 13, 2018.

(51) Int. Cl.
*B65G 47/91* (2006.01)
*B01D 46/24* (2006.01)

(52) U.S. Cl.
CPC ......... *B65G 47/91* (2013.01); *B01D 46/2403* (2013.01); *B01D 2265/025* (2013.01); *B01D 2265/029* (2013.01); *B01D 2275/201* (2013.01)

(58) Field of Classification Search
None
See application file for complete search history.

(56) References Cited

U.S. PATENT DOCUMENTS

| 3,168,467 | A | * | 2/1965 | Dreyer | B01D 29/606 |
| | | | | | 210/108 |
| 2009/0106888 | A1 | * | 4/2009 | Mattson, Jr | A61H 33/6073 |
| | | | | | 4/541.1 |
| 2010/0135760 | A1 | | 6/2010 | Hjornet | |
| 2011/0291433 | A1 | * | 12/2011 | Feng | B25J 15/0616 |
| | | | | | 294/65 |
| 2015/0017020 | A1 | * | 1/2015 | Trott | C10G 7/04 |
| | | | | | 417/32 |
| 2016/0096278 | A1 | * | 4/2016 | Cho | F16B 47/00 |
| | | | | | 294/185 |
| 2019/0084012 | A1 | | 3/2019 | McCoy, Jr. | |

* cited by examiner

*Primary Examiner* — Ronald P Jarrett
(74) *Attorney, Agent, or Firm* — Van Pelt, Yi & James LLP

(57) ABSTRACT

In one embodiment, a material sorting system comprises: a suction gripper assembly, the suction gripper comprising: a body assembly that includes: an internal airflow passage configured to communicate an airflow between an airflow application port positioned at a first end of the body assembly and a gripping port positioned at the opposing second end of the body assembly; a cup fitting attached to the gripping port; a suction cup secured to the cup fitting; an attachable filter inserted into the suction cup and fastened to the cup fitting; and a mounting assembly, wherein the mounting assembly includes one or more mounting points for pivotally attaching the suction gripper assembly to a sorting robot of the material sorting system.

19 Claims, 8 Drawing Sheets

SUCTION GRIPPER DEBRIS FILTER

CROSS-REFERENCE TO RELATED APPLICATIONS

This patent application is a continuation of U.S. patent application Ser. No. 16/536,736, entitled SUCTION GRIPPER DEBRIS FILTER filed Aug. 9, 2019, which is a U.S. Patent Application claiming priority to, and the benefit of, U.S. Provisional Patent Application No. 62/718,150, titled "SUCTION GRIPPER DEBRIS FILTER" filed Aug. 13, 2018, each of which is incorporated herein by reference in its entirety.

BACKGROUND

Suction grippers are mechanisms used to pick up and move objects by applying a concentrated vacuum to portion of an object's surface with sufficient vacuumed strength to hold the object to the gripper. Suction grippers thus have some distinct advantages over mechanical grippers. For example, a suction gripper mechanism may be implemented with fewer mechanical parts that are subject to wear, malfunction or otherwise require maintenance. Suction grippers, however, face challenges operating in environments, such as recycling and consumer waste handling facilities, where the atmosphere is high in dust or other particulates, and where the target object that needs to be captured is not clean. In such a dusty high particulate environment with flexible objects, such as plastic bags, the accumulation of contaminants can be expected to eventually fowl the internal of the vacuum motor. While inline filters may be installed, these filters often quickly and frequently clog with dust due to operating in the dusty high particulate environment, which will limit the force of the vacuum available for the suction gripper to secure a target object. The frequent maintenance needed to clear or replace particulate clogged inline filters results in significant downtime of the system. For the reasons stated above and for other reasons stated below which will become apparent to those skilled in the art upon reading and understanding the specification, there is a need in the art for an improved suction gripper debris filter.

SUMMARY

In one embodiment, a material sorting system comprises: a suction gripper assembly, the suction gripper comprising: a body assembly that includes: an internal airflow passage configured to communicate an airflow between an airflow application port positioned at a first end of the body assembly and a gripping port positioned at the opposing second end of the body assembly; a cup fitting attached to the gripping port; a suction cup secured to the cup fitting; an attachable filter inserted into the suction cup and fastened to the cup fitting; and a mounting assembly, wherein the mounting assembly includes one or more mounting points for pivotally attaching the suction gripper assembly to a sorting robot of the material sorting system.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
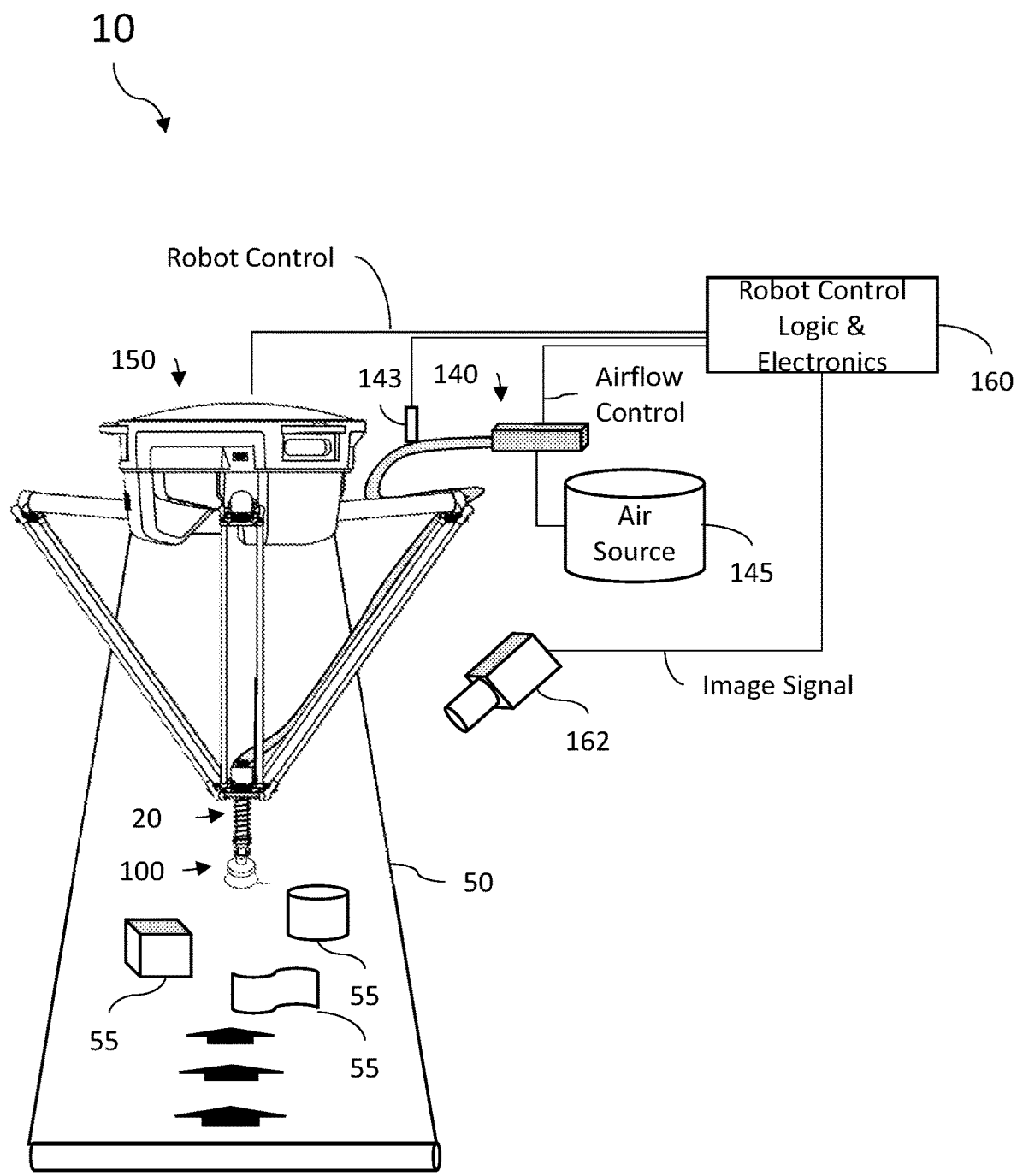
FIG. 1 is a diagram illustrating a robotic vacuum sorting system 10 of one embodiment of the present disclosure.

FIG. 1 is a diagram illustrating a robotic vacuum sorting system 10 of one embodiment of the present disclosure. As shown in FIG. 1, a suction gripper 20 is pivotally mounted to one or more arms of a sorting robot 150. System 10 supplies airflow to the suction gripper 20 via vacuum system 140. In some embodiments, the vacuum system 140 may be further pneumatically coupled to an air source 145, which may comprise a blower, an air compressor, a compressed air storage tank, or some combination thereof. Although this disclosure may refer to "air" with regards to "airflow", "air compressor" and other elements, it should be understood that the term "air" is used in a generic sense to refer to any compressible gas or minute of gasses. The sorting robot 150 and vacuum system 140 are coupled to and controlled by robot control logic and electronics 160. Robot control logic and electronics 160 may comprise or otherwise be implemented with one or more processors coupled to a memory and programmed to execute code to implement the function attributed to robot control logic and electronics 160 described herein. As such, to communicate control signals, robot control logic and electronics 160 may further comprise elements to generate electrical and/or control pneumatic signals to the sorting robot 150 and vacuum system 140. In some implementations, robotic vacuum sorting system 10 further comprises at least one imaging device 162 (which may comprise, for example, an infrared camera, visual spectrum camera, or a some combination thereof) directed at a conveyer belt 50 that transports target objects (shown at 55) within the operating reach of the robotic vacuum sorting system 10. The imaging device produces an image signal that is delivered to the robot control logic and electronics 160 and which may be used by robot control logic and electronics 160 to send control signals to the sorting robot 150 to position the suction gripper 20, and send airflow control signals to the vacuum system 140, in order to initiate a capture action. In some embodiments, the robotic vacuum sorting system 10 may also comprise a pressure sensor 143 providing a signal to the robot control logic and electronics 160 so that a vacuum is successfully achieved. For additional details of robotic vacuum sorting system 10 which may be used in combination with the embodiments described herein, see U.S. Provisional Patent Application 62/561,400 titled "Systems and Methods for Robotic Suction Grippers" filed on Sep. 21, 2017, which is incorporated herein by reference in its entirety.

Embodiments of the present disclosure provide for an attachable filter to block obstructions from entering a suction-based piping systems, such as the vacuum system 140 of the robotic vacuum sorting system 10 shown in FIG. 1. As discussed below, the attachable filter embodiments described herein provide the ability to avoid blockages causes by large objects, plastic sheets and/or bags and the like, demonstrate an extended period of operation before filters need to be cleaned or replaced due to particulate (i.e. dust) accumulation, and can produce volumetric flow rate improvements through the bellowed suction gripper assembly 20 over prior designs, including a design using no filter at all. As illustrated below, in some embodiments, the attachable filter disclosed here comprise a porous apparatus (that is, a device having many apertures or holes that permit air to flow through the device) that attaches to the inlet of a vacuum piping system, such as for a robotic suction gripper. The holes allow air and small partials, such as dust, to enter the piping system, while blocking out large objects, such as plastic bags.

Figure 2:
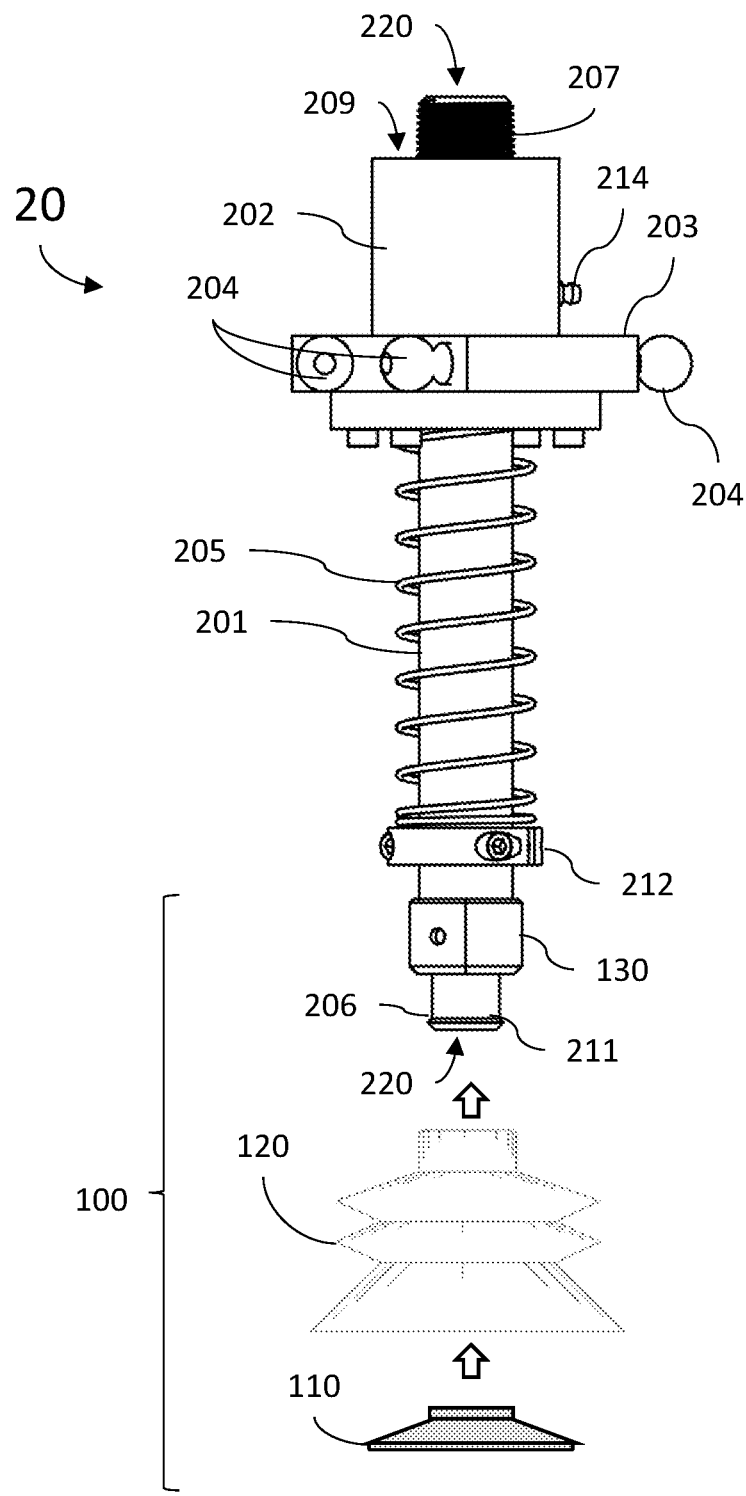
FIG. 2 illustrates a suction gripper device of one embodiment of the present disclosure.

FIG. 2 is a diagram illustrating a suction gripper mechanism 20 (also referred to herein as "suction gripper 20" or "suction gripper assembly 20") of one embodiment of the present disclosure such as described with respect to FIG. 1. In some embodiments, the gripper assembly 20 comprises a body assembly 202 and a mounting assembly 203. In the embodiment shown in FIG. 2, body assembly 202 houses a linear bearing component 209, and mounting assembly 203 is rigidly secured around the body assembly 202. In one embodiment, the mounting assembly 203 comprises a ring shaped assembly having a through hole through which the linear bearing component 209 is positioned and securely attached. In some embodiments, the mounting assembly 203 and the body assembly 202 may be rigidly coupled together such as through a weld or mechanical fastener. In some embodiments, the mounting assembly 203 and body assembly 202 may comprise a single integrated part. The mounting assembly 203 further comprises one or more mounting points 204 via which the mounting assembly 203 can be pivotally coupled to the sorting robot 150.

In the embodiment of FIG. 2, the suction gripper assembly 20 further comprises a linear shaft element 201 secured within the linear bearing 209 and having a freedom to travel axially up and down with respect to the axis of the linear bearing 209. The linear shaft 201 comprises an internal airflow passage 220 configured to communicate an airflow (having either a positive or negative air presser) between an airflow application port 207 positioned at a first end of the linear shaft 201 and a gripping port 206 positioned at the opposing second end of the linear shaft 201. The suction cup assembly 100 may comprise a flexible, bellowed suction cup element 120 (which may be a rubber, latex, or other flexible material) and removable coupler, or cup fitting 130, which may be attached to the linear shaft element 201 and define the opening of the gripping port 206. In some embodiments, the linear shaft 201 may be free to travel axially up and down within a linear bearing 209. A spring mechanism 205 is positioned between the mounting assembly 203 and a stop device 212 located near the distal second end of the linear shaft 212 proximate to the gripper port 206, to hold the linear shaft 201 in a fully extended position when the suction gripper 100 is not holding a target object 55.

Figure 2A:
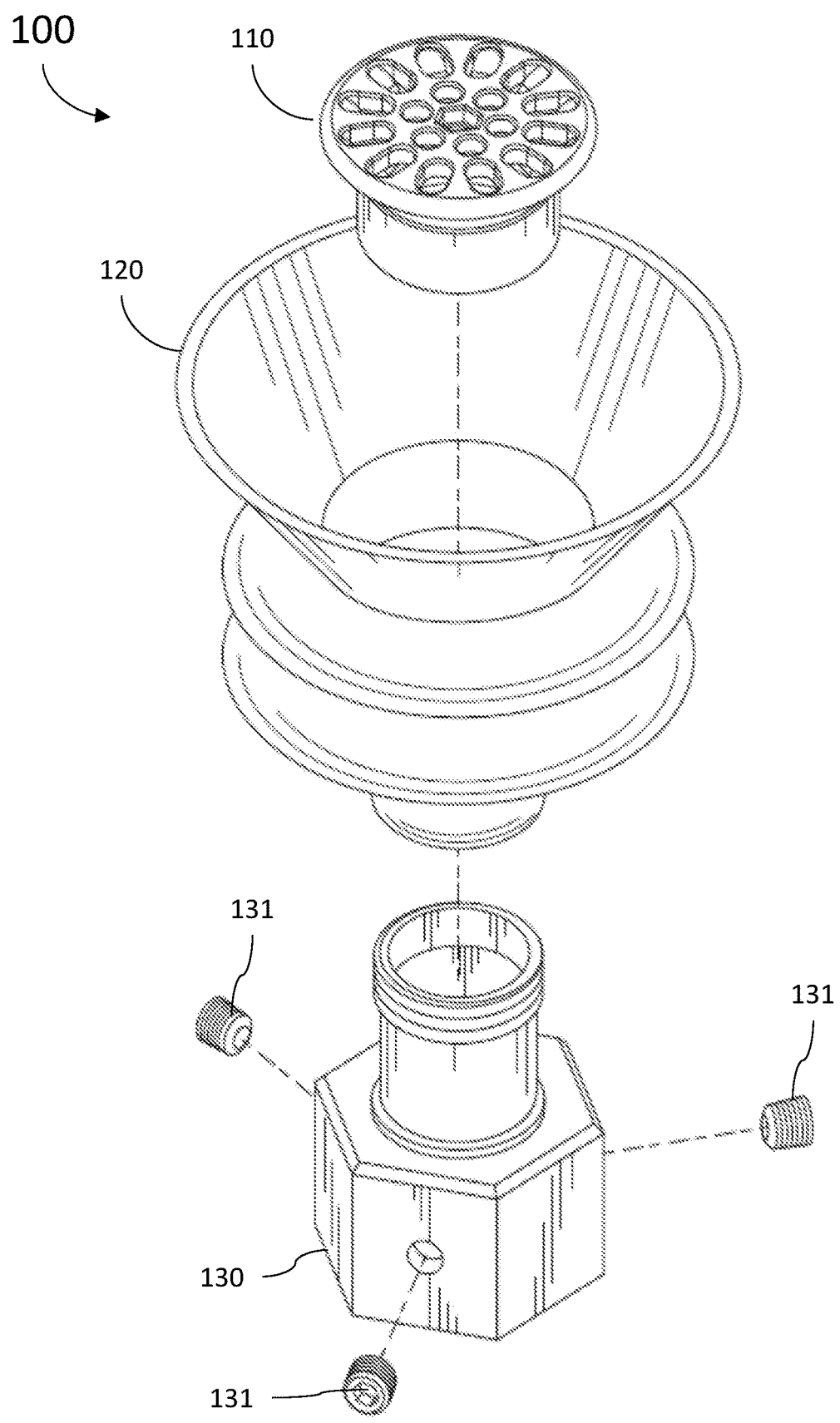
FIG. 2A illustrates a suction cup assembly of one embodiment of the present disclosure.

FIG. 2A is an exploded view diagram illustrating an example attachable filter 110 in combination with a bellowed suction cup 120. In this embodiment, the attachable filter 110 is positioned within the suction cup 120 and fastened to the cup fitting 130 from within the suction cup 120. The cup fitting 130, in turn, mounts the components of the suction cup assembly 100 to linear shaft element 201 of the gripper assembly 20. As shown in FIG. 2A, the attachable filter 110 may be rigidly fastened to the cup fitting 130 by a threaded connection. In other embodiments, other fastening mechanisms, such as but not limited to a twist cam or set screws, may be used. The cup fitting 130 may be secured to the gripper assembly 20 by set screws, clamps, threads, or other fastening mechanisms 131. Having a rigidly attached attachable filter 110, as opposed to a press-fitted filter, can be beneficial in many application, including recycling robotics, where a dislodged filter may cause mechanical jams within the gripper assembly 20 or other undesired effects. A filter at the pipe inlet to the gripper assembly 20 and vacuum system 140, as opposed to somewhere along the piping system, is also beneficial in blocking obstructions from entering the piping system all together.

Figure 2B:
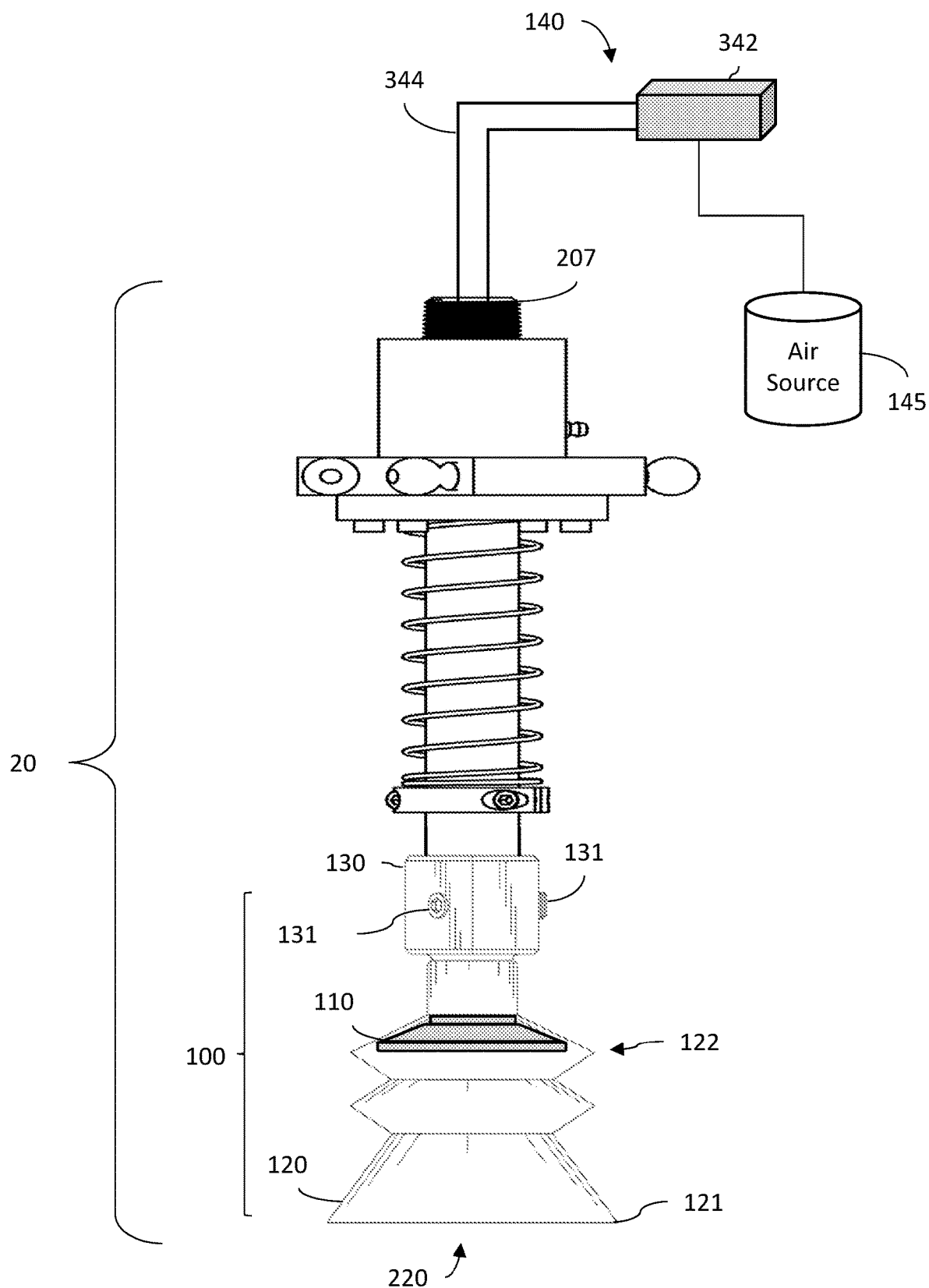
FIG. 2B illustrates a suction cup assembly in combination with a vacuum system of one embodiment of the present disclosure.
Figure 2C:
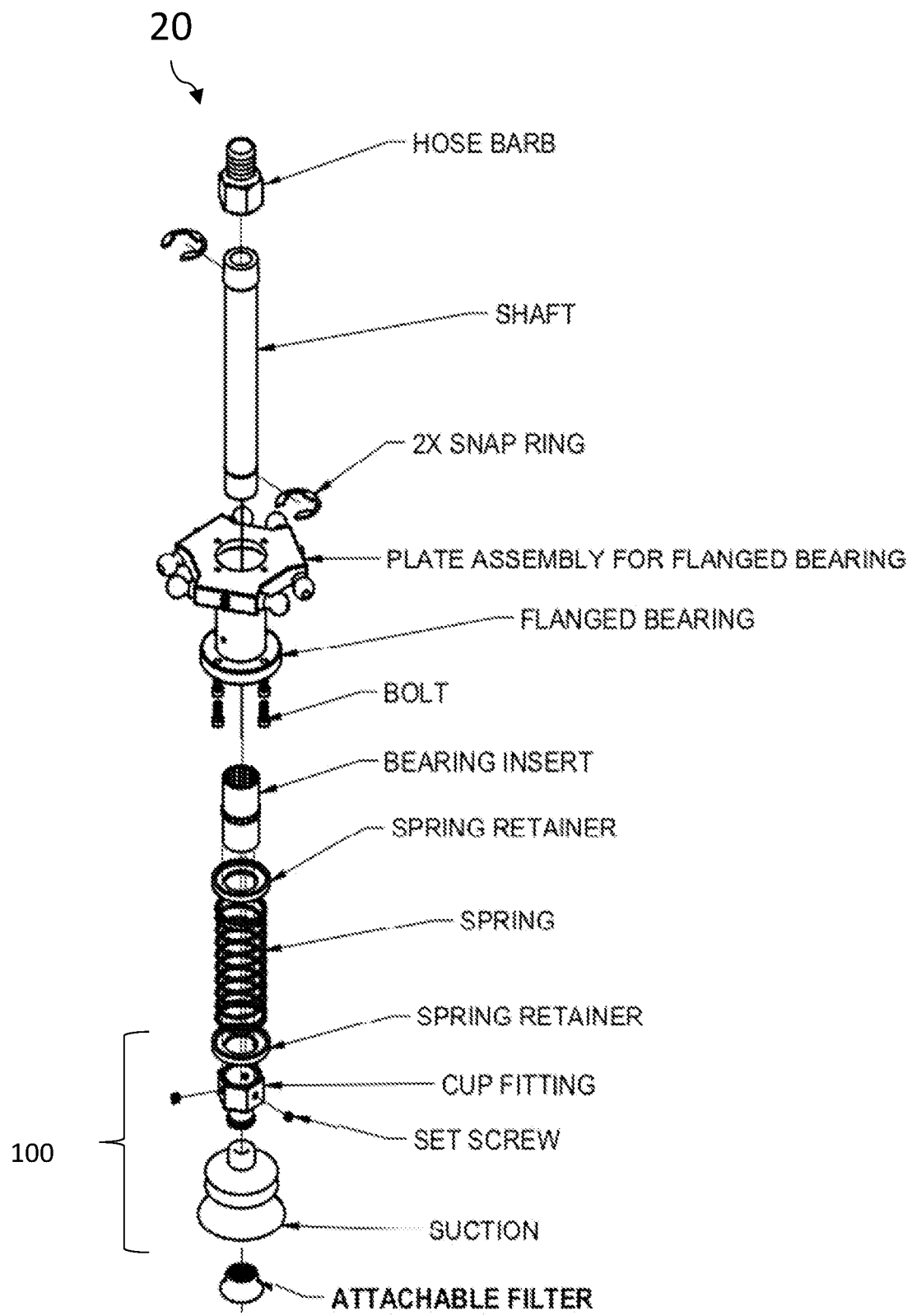
FIG. 2C illustrates a suction cup assembly in combination with a suction gripper of one embodiment of the present disclosure.

Referring to FIG. 2B, in some embodiments, the vacuum system 140 comprises a vacuum generator 342 coupled to the airflow port 207 of suction gripper 20, and providing an airflow through the internal airflow passage 220 via (for example) air supply tubing 344. In some embodiments, the vacuum generator 342 comprises a compressed air driven Venturi and/or Coanda type technology vacuum system. That is the motive force that pulls a vacuum through supply tubing 344 is a flow of a compressed air stream (for example, supplied by air source 145) that flows through the vacuum generator 342. Utilization of a Venturi and/or Coanda vacuum generator addresses the problem of pulling dirty (that is, particulate heavy) air into an intake of a vacuum motor. In some embodiments, the vacuum generator 342 is designed such that its vacuum port and exhaust path are placed directly inline (straight through), undisturbed. The utilization of a Venturi and/or Coanda technology vacuum generator 342 in combination with the suction gripper 20 reduces the need for particulate filtration because such a vacuum system 140 can internally separate dust particles from the airflow received from the suction gripper 20. Dust that is not separated by the vacuum system 140 may be conveniently discharged, for example into an optional holding container, as opposed to being pulled into a vacuum motor.

Accordingly, one objective of the attachable filter 110 is to block large objects 55 from entering the piping of the vacuum system 140 through the suction gripper 20. Some objects 55, such as plastic bags or sheets of plastic, may be sucked into piping of the vacuum system 140 by entering through the suction cup 120, and passing through the cup fitting 130. The attachable filter 110 acts as a barrier for such large objects, while still allowing air and small, harmless particulates to enter the piping of vacuum system 140.

In some embodiments, the attachable filter 110 may also serve to keep the suction cup 120 from collapsing on itself.

When too much downward force is applied to certain suction cups, the bottom skirt 121 of the suction cup may fold over the bellows 122. As such, in some embodiments, the attachable filter 110 is designed to have a length so that the filter 110 will at least partially restrict compression of the suction cup. That is, the attachable filter 110 may collide with the object 50 before the cup 120 reaches the critical amount of compression that can lead to collapsing of the bottom skirt.

Figure 3A:
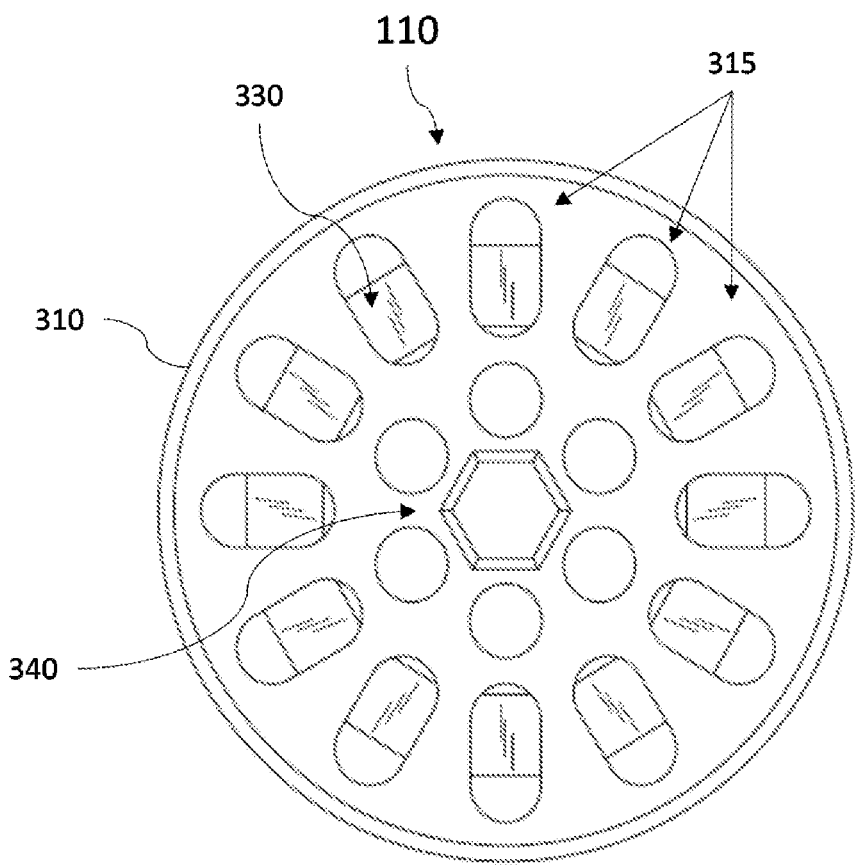
FIGS. 3A, 3B and 3C illustrate top, side, and isometric views of an attachable filter for use with a suction cup of one embodiment of the present disclosure.
Figure 3B:
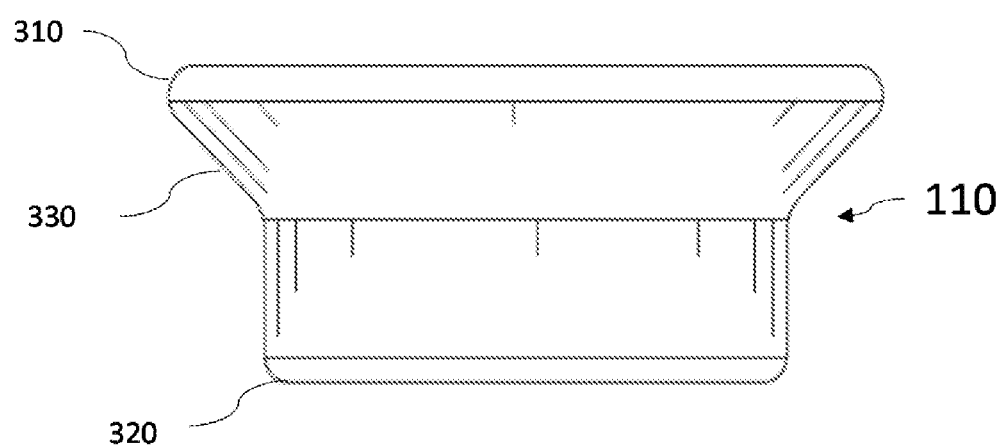
Figure 3C:
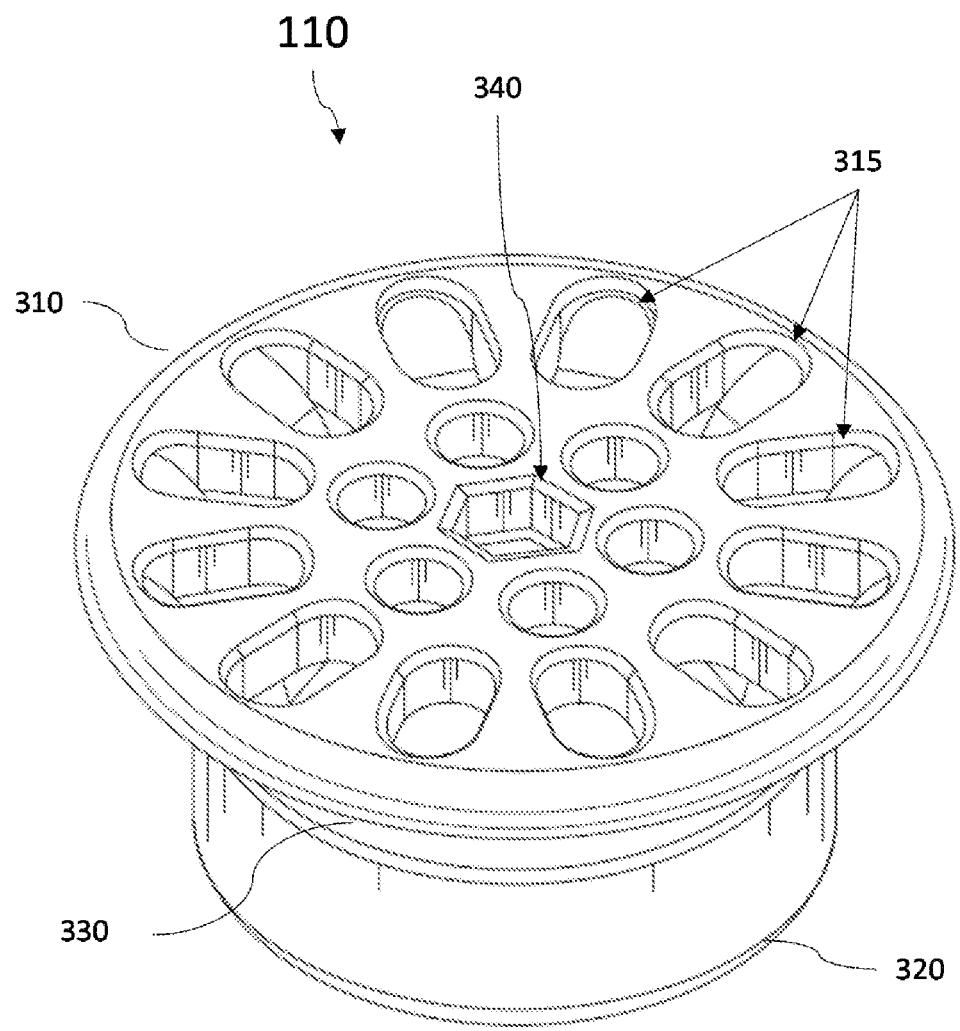

FIGS. 3A, 3B and 3C illustrate respective top, side and isometric views of the attachable filter 110 of one embodiment of the present disclosure. The attachable filter 110 comprises a suction application surface 310 that includes a plurality of holes 315 (i.e., the above mentioned pores), and an open port mounting interface 320 that includes fastening features (such a threads for example) compatible with fastening features of the cup fitting 130 for which it can be coupled. The attachable filter 110 is easy to install, compared to other filter alternatives.

The plurality of holes 315 allow air to pass through the Filter 110 and into the air supply tubing 344 of the vacuum system. In some embodiments, the largest outer diameter of the attachable filter 110 may be slightly smaller than the smallest inner diameter of the suction cup 120 into which is it inserted. This means it can fit though the suction cup 120 with ease. In some embodiments, the attachable filter 110 may provide a keyed holed 340 for insertion of a tool used to install or remove the attachable filter 110 from the cup fitting 130. For example, in FIG. 3A, a hexagonal shaped hole 340 at the center of the suction application surface 310 is designed for a standard Allen Key to be inserted, so that the user can easily tighten and torque the attachable filter 110 (for example, via threads) onto cup fitting 130.

As mentioned above, the plurality of holes 315 may be sized to allow dust and fine particles through the system but prevent materials such a plastic bags and similar objects larger than about ½ inch in diameter. So as to not unnecessarily restrict volumetric flow, the total cross-sectional area of the holes 315 of the attachable filter 110 should be greater than the smallest pipe cross-sectional area (e.g. of the internal airflow passage 220), which in the example embodiment of FIG. 2A would be the opening in the cup fitting 130 for port 206. This means that theoretically, the adaptive filter 110 may only act as a minor loss in the vacuum system 140, and does not significantly decrease the volumetric flow rate through internal airflow passage 220. Moreover, the plurality of holes 315 are large enough such that they are not easily clogged by dust sized particulates, but small enough that plastic bag/sheet type objects 50 do not get pulled into the cup fitting 130 or further into the suction gripper 20 or air supply tubing 344. The holes 315 are not necessarily circular, but may comprise different shapes. Moreover, the holes 315 on any given suction application surface 310 need not be uniform in either size or shape, though they may be. In one non-limiting example embodiment of attachable filter 110, the suction application surface 310 may comprise a plurality of holes 315 that are circular, or approximately circular, each having a diameter greater than or equal to 1 millimeter (mm) up to 2 centimeter (cm). In another example embodiment of the of attachable filter 110, the suction application surface 310 may comprise a plurality of holes 315 that may be generally circular or comprise another geometric shape each having a cross section area from 1 $mm^2$ to 2 $cm^2$. Rounded and circular shaped holes 315 in particular contribute to prevent dirt build up over long periods of time. Such hole sized can be expected, given the typical dust particulates found in a typical recycling facility, to permit continuous operation of the gripper assembly 20 for periods of 1 week or more without requiring filter change due to particulate clogging, and without clogging of the gripper assembly 20 due to inhaling of plastic bags, sheets, or other materials. The attachable filter 110 is thus designed to withstand an extended period of time in dirty environments, without needing to be cleaned. The relatively large holes 315 (which may be combined with other optional features such as rounded fillets and a smooth converging neck) means that dirt and grime will not clog the attachable filter 110. Unlike filters made out of mesh, fibers, or the like, which may require replacement or cleaning multiple times per day, the attachable filter 110 does not clog the piping system with particular grime or large plastic material.

Although the attachable filter 110 will prevent the suction system 140 from becoming clogged from a large object, a plastic bag or sheet may still cause a blockage within the bellows 122 of the suction cup 120. For such cases, the vacuum system 140 may be reversed to create a positive flow of air out from the attachable filter 110 to expel the object. In some embodiments, the robot control logic and electronics 160 controls the vacuum system 140 to optionally reverse the airflow through the suction gripper 20 to release and/or propel the object from the suction cup 130. In some embodiments, the airflow may be reversed at the completion of each capture action. In other embodiments, the robot control logic and electronics 160 may sense a blockage, for example based on an output from the pressure sensor 143 and based on that sensor output reverse the airflow to expel the object. In such embodiments, having the attachable filter 110 rigidly fastened to the cup fitting 130 (such as described below) may serve to prevent expulsion of the attachable filter during times of reversed airflow operation where air is blown out from the suction gripper 20.

Referring back to FIGS. 3A-3C, between the suction application surface 310 and mounting interface 320, the internal airflow passage of the attachable filter 110 comprises angled walls 330 defining within the filter 110 a partially conical, funnel shaped passage that tapers to a smaller inner diameter from the suction application surface 310 towards the mounting interface 320. The funnel shaped passage functions to channel the airflow seamlessly through the suction cup 120, and directs it to gripping port 206 and into the vacuum system 140. This geometry has been found by the inventors to not only provide from a greater volumetric flow rate through the suction gripper 20 as compared to prior fine filters, but also a greater volumetric flow rate through the suction gripper 20, measured from the bottom of a suction cup, as compared to a suction gripper 20 having no filter installed at all.

For example, when an airflow is pulled into the suction cup 120 by vacuum system 140, the bellows 122 will generate turbulence due to the substantial changes in cross-sectional area, and thus decrease average flow. In a case with a suction cup 120 that comprises one or more many bellows 122, the geometry of the attachable filter 110 essentially decreases the number of area changes inside the suction cup 120 as seen by the fluid flow, thus decreasing the amount of turbulence, and therefore, increasing average flow. The minor loss introduced by introducing the adaptive filter 110 is less than the losses due to the changes in cross-sectional area of the suction cup. In one set of controlled experiments performed by the inventors comprising about 20 trials, the flowrate of a suction cup assembly 100 was measured as alternately equipped with no filter, a prior art mesh disk-filter, and with an attachable filter 110. After completing the experiments, it was found that the suction cup assembly 100 when combined with the Attachable Filter allowed the most suction flow to enter the suction cup 130, at an average of 29.1 CFM, while the disk-filter only allowed 22.5 CFM, and the suction cup 130 without a filter allowed 25.85 CFM of airflow. Although installing the Attachable Filter 100 in the suction cup assembly 100 introduces a minor loss, it provides a less interrupted channel for airflow, which, supported by experimental results, increases the average flowrate.

Figure 4:
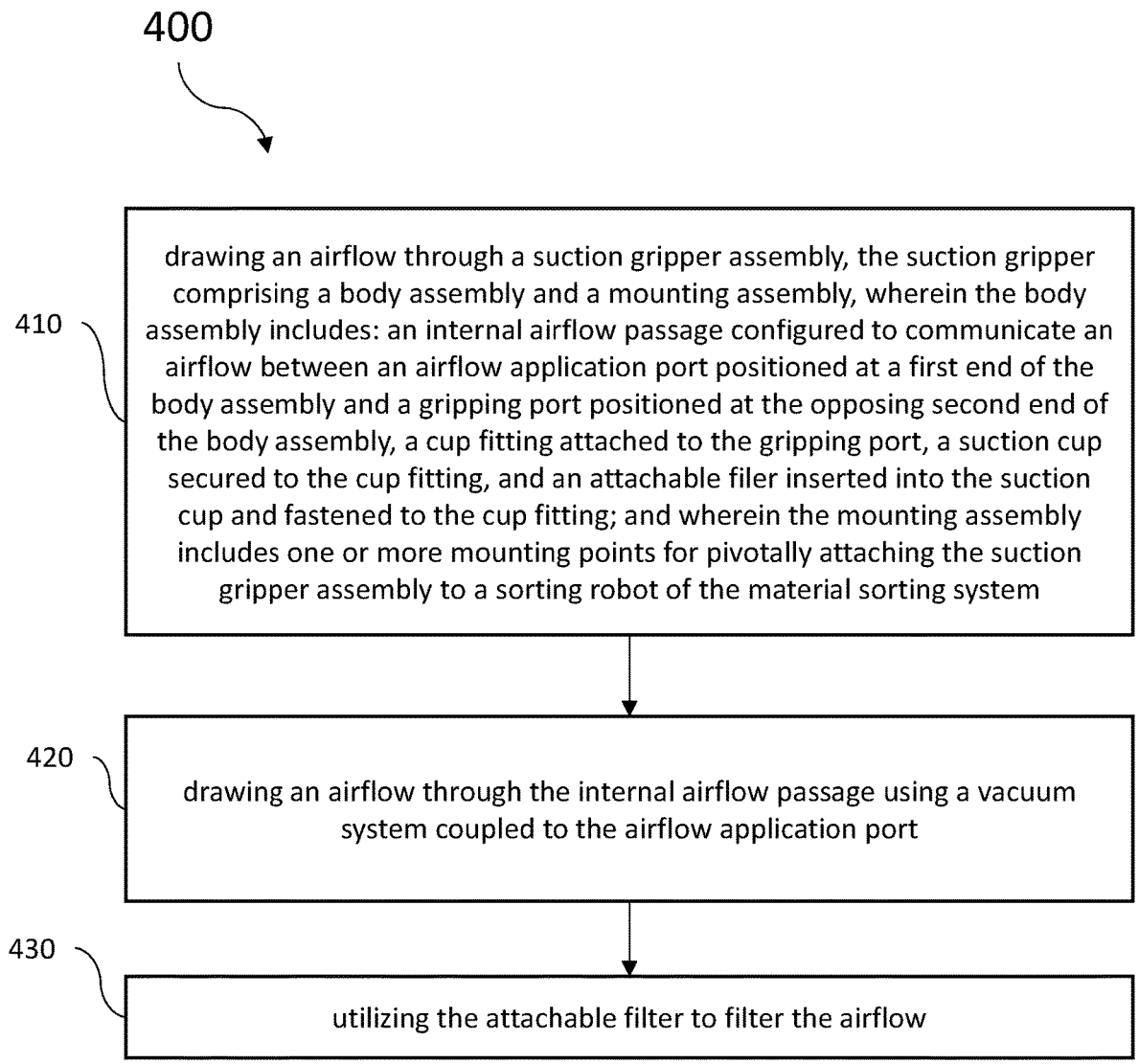
FIG. 4 is a flow chart illustrating a method 300 for one embodiment of the present disclosure.

FIG. 4 is a flow chart illustrating a method 400 for one embodiment of the present disclosure. It should be understood that the features and elements described herein with respect to the method 400 shown in FIG. 4 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 4 may apply to like named or described elements for any of the other figures and embodiments and vice versa. The method 400 begins at 410 with drawing an airflow through a suction gripper assembly, the suction gripper comprising a body assembly and a mounting assembly such as shown in any of the figures and embodiments discussed above. The body assembly includes: an internal airflow passage configured to communicate an airflow between an airflow application port positioned at a first end of the body assembly and a gripping port positioned at the opposing second end of the body assembly, a cup fitting attached to the gripping port, a suction cup secured to the cup fitting, and an attachable filter inserted into the suction cup and fastened to the cup fitting; and wherein the mounting assembly includes one or more mounting points for pivotally attaching the suction gripper assembly to a sorting robot of the material sorting system. The method proceeds to 420 with drawing an airflow through the internal airflow passage using a vacuum system coupled to the airflow application port and to 430 with utilizing the attachable filter to filter the airflow.

In various alternative embodiments, system elements, method steps, or examples described throughout this disclosure (such as the sorting robot, robot control logic & electronics, imaging devices, vacuum system, and/or subparts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system, the system comprising:
a suction gripper assembly comprising:
an internal airflow passage configured to communicate an airflow between an airflow application port positioned at a first end of the suction gripper assembly and a gripping port positioned at a second end of the suction gripper assembly;
a cup fitting attached to the gripping port; and
an attachable filter coupled to the cup fitting, wherein the attachable filter comprises a keyed hole configured to receive a tool for installing the attachable filter in the cup fitting, or removing the attachable filter from the cup fitting.

2. The system of claim 1, wherein the attachable filter is coupled to the cup fitting by one or more of the following: a threaded connection, a twist cam, or a set screw.

3. The system of claim 1, wherein the suction gripper assembly further includes a suction cup coupled to the cup fitting and wherein the suction gripper assembly is inserted into the suction cup.

4. The system of claim 3, wherein the suction cup comprises a bellows suction cup.

5. The system of claim 3, wherein the attachable filter extends from the cup fitting into the suction cup to at least partially restrict compression of the suction cup.

6. The system of claim 1, wherein the attachable filter comprises a suction application surface that includes a plurality of holes.

7. The system of claim 6, wherein the plurality of holes comprises holes that are circular or approximately circular.

8. The system of claim 6, wherein the plurality of holes comprises rounded fillets.

9. The system of claim 6, wherein each of at least some of the plurality of holes has a diameter greater than or equal to 1 millimeter up to 2 centimeters.

10. The system of claim 6, wherein each of at least some of the plurality of holes has a cross section area from 1 mm$^2$ to 2 cm$^2$.

11. The system of claim 6, wherein the attachable filter comprises a conical shape converging from the suction application surface towards the cup fitting.

12. The system of claim 1, wherein the suction gripper assembly is coupled to a sorting robot, wherein the sorting robot is configured to position the suction gripper assembly.

13. The system of claim 1, further comprises a vacuum generator, wherein the vacuum generator is coupled to the airflow application port of the suction gripper assembly.

14. The system of claim 13, wherein the vacuum generator comprises a compressed air drive Venturi or Coanda vacuum system.

15. The system of claim 1, further comprising:
a vacuum system coupled to the airflow application port of the suction gripper assembly;
a pressure sensor; and
wherein the vacuum system is configured to reverse airflow direction through the internal airflow passage in response to an output from the pressure sensor.

16. A method, comprising:
drawing an airflow through a suction gripper assembly, wherein the suction gripper assembly includes: an internal airflow passage configured to communicate the airflow between an airflow application port positioned at a first end of the suction gripper assembly and a gripping port positioned at a second end of the suction gripper assembly, a cup fitting attached to the gripping port, and an attachable filter coupled to the cup fitting, wherein the attachable filter comprises a keyed hole configured to receive a tool for installing the attachable filter in the cup fitting, or removing the attachable filter from the cup fitting; and
using the attachable filter to filter the airflow.

17. The method of claim 16, wherein the suction gripper assembly further includes a suction cup coupled to the cup fitting and wherein the suction gripper assembly is inserted into the suction cup.

18. The method of claim 17, wherein the suction cup comprises a bellows suction cup.

19. The method of claim 16, wherein the attachable filter comprises a conical shape converging from a suction application surface towards the cup fitting.

* * * * *